Feb. 9, 1960 S. A. FIERSTON 2,924,747

SHIFT REGISTER

Filed June 16, 1958 2 Sheets-Sheet 1

INVENTOR.
STANLEY A. FIERSTON
BY F. D. Sullivan
ATTORNEY.

INVENTOR.
STANLEY A. FIERSTON
BY
F. D. Sullivan
ATTORNEY.

United States Patent Office 2,924,747

Patented Feb. 9, 1960

2,924,747

SHIFT REGISTER

Stanley A. Fierston, Lynn, Mass., assignor, by mesne assignments, to Sylvania Electric Products Inc., Wilmington, Del., a corporation of Delaware Application June 16, 1958, Serial No. 742,163

5 Claims. (Cl. 315—84.5)

This invention is concerned with electronic data processing equipment, and particularly with an improved shift register for use in such equipment.

Electronic pulse-shifting registers generally comprise a series chain of bi-stable signal or storage elements which are so interconnected that each element of the chain assumes the signal state or condition of its immediately preceding element when a shift pulse is applied to the network. Since the two states of the bi-stable elements are readily adaptable to store signals representing the zero or the one of a binary mathematical system, these shift registers find useful application in the arithmetical operations of electronic computers. They are also used to provide storage or delay for digital information, for conversion between parallel and serial data flow, and other digital data processing purposes.

Hitherto, the bi-stable signal elements of shift registers have generally comprised electromagnetic relays, magnetic cores, or flip-flop circuits employing an average combination of four diodes and vacuum tubes or transistors per register stage. Within their respective limitations of maintenance difficulties, operating speed, and circuit complexity, these elements have provided satisfactory registers. They have, however, the common disadvantage of relatively high cost in dollars and in number of circuit components with a consequent lowering of reliability. Also, it is sometimes necessary or desirable to provide visual indication of the contents of each stage of a register for monitoring or maintenance purposes. With these prior art registers, this has required the addition of indicating lamps or other devices which further increase cost and circuitry, and reduce reliability.

Accordingly, it is an object of the present invention to provide an improved shift register for use in electronic data processing equipment.

Another object is to provide a shift register which will be less complicated in structure, more reliable in operation, and more economical to manufacture than those hitherto available.

A further objective is to provide a shift register wherein the signal storage elements of each stage will be more functionally economic, and provide visual as well as electrical indication of digital content.

These and related objectives are accomplished in an embodiment of the invention which will be described as featuring a shift register wherein each stage comprises only a single bi-stable glow tube of the thyratron type with its supporting circuitry.

The bi-stable qualities of the thyratron which are significant to the invention are its characteristics of changing from non-conducting to conducting condition in response to a signal on its control grid, the grid's losing control once conduction between cathode and plate has been established, and the sharp cut-off when the conduction current falls below a critical value followed immediately by return to a potentially conductive condition. Thus, a thyratron in conducting condition can indicate a binary one electrically, by the reduced potential at its plate, and visually, by the glow of its ionized gas; and, in cut-off condition, can signal a binary zero electrically, by raising the plate electrode to B+ potential, and visually, by quenching the glow.

The shift register is assembled by linking the desired number of thyratrons in a series chain, with the plate of each connected through an appropriate delay device to the control grid of its next adjacent successor.

With ones and zeros stored in the various stages of the register, shifting is accomplished in the following manner. A shift pulse is applied to a transistor, or other appropriate switching device in the thyratron cathode returns, to lower the current from cathode to plate for a long enough period to stop conduction. The delay device in the connection between thyratrons, however, has a longer time characteristic than the shift pulse. Consequently, if the preceding thyratron is conducting to represent a one when the shift pulse is applied, the positive going signal due to cut-off is applied to the control grid of the succeeding thyratron after it has returned to a potentially conductive condition. This signal thereupon causes the succeeding thyratron to conduct, reflecting the one condition of the preceding stage at the time the shift pulse was applied. If the preceding thyratron is non-conductive, indicating a zero, when the shift pulse is applied its plate remains at substantially B+ potential and no signal is transmitted to the control grid of the next tube. This tube therefore remains non-conductive indicating the zero state of the preceding stage when the shift pulse occurred.

Thus, a relatively simple, inexpensive, and reliable shift register which gives visual as well as electrical indication of the digital content of each stage is provided.

Other objects and features of the invention will be apparent from the following more detailed description of the illustrative embodiment and reference to the accompanying drawings, wherein.

Figure 1:
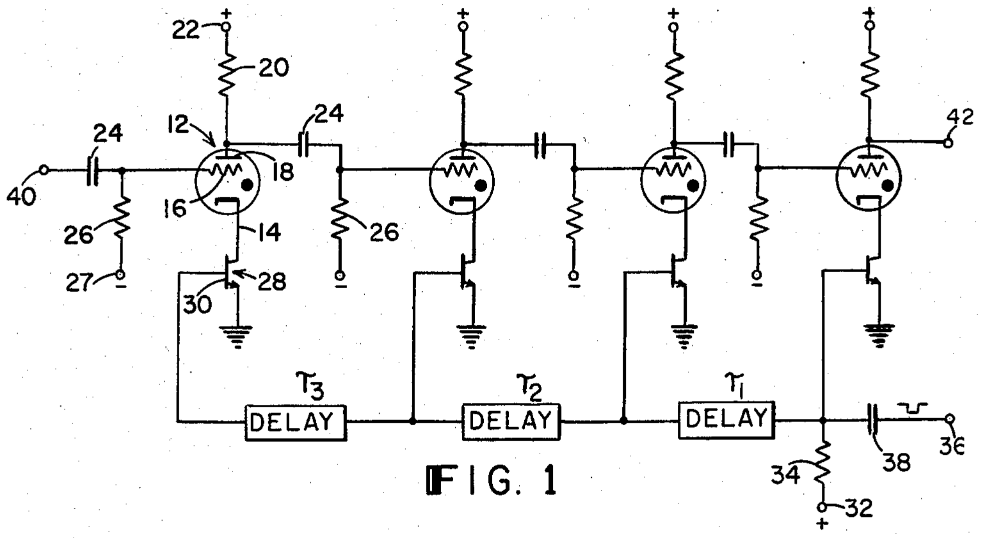
Fig. 1 is a schematic diagram of a shift register embodying the invention.

The schematic diagram of Fig. 1 shows, for illustrative purposes, a four stage shift register. Each stage is comprised of a thyratron 12 having cathode 14, control grid 16, and plate 18 electrodes. Each plate or anode 18 is connected, through a load resistor 20, to a positive potential source 22 and, through a differentiating or pulse shaping network comprising a capacitor 24 and a resistor 26, to the control grid 16 of the next adjacent or succeeding thyratron 12 in the series chain which comprises the shift register.

The load resistor 20 and the potential applied to terminal 22 should both be high enough to prevent self-oscillation of the thyratron 12 and to provide sufficient amplitude in the output signal pulse to enable it to trigger the next stage. By way of example, values of 100K ohms for resistor 20 and +85 volts at terminal 22 are suggested for use with thyratron type CK1050. Control grid 16 is biased by a negative potential applied from terminal 27 through resistor 26. The values of this resistor and potential combination should be adjusted to provide a proper limit to grid current and the desired shaping of the signal pulse from anode 18.

The cathodes 14 of the thyratrons 12 are connected, through transistors 28 to ground. These transistors 28 are normally biased to conductive condition by a positive potential applied from terminal 32 via biasing resistor 34 to their base 30. They also may be rendered non-conductive by negative pulses applied from "shift and clear" terminal 36 through D.C. isolating capacitor 38 and relays $r_1$, $r_2$, etc.

Input pulses may be applied to the grid of the first tube through terminal 40, and output pulses may be derived from the plate of the final tube via terminal 42. Alternatively, input signals may be applied in parallel to each stage by appropriate connection (not shown) to each of the control grids, and parallel output signals may be derived from each stage via connection (also not shown) to the separate anodes 18.

This shift register processes pulses representing digital data by operating in the following manner.

To insert a one into the register a positive going pulse of sufficient amplitude is applied to the control grid 16 of the appropriate thyratron 12 to trigger this thyratron into conducting condition whereupon the grid 16 loses control. A one is now stored in the tube as indicated by the lowered anode voltage and the glow of the ionized gas.

This stored signal is shifted to the next adjacent tube in the series chain by applying a negative going shift pulse to terminal 36. This pulse arrives via capacitor 38 at the base 30 of normally conducting transistor 28 to cut off the transistor and thereby reduce the plate-cathode current of the thyratron 12 to the point where the thyratron ceases to conduct. Since this change from conducting to non-conducting condition takes place at a discrete value of current, the voltage at plate 18 effectively jumps from its conducting level up to its non-conducting potential of approximately B+. This voltage change, properly differentiated by the combination of capacitor 24 and resistor 26, applies a signal pulse of the required positive going polarity and sufficient amplitude to the control grid 16 of the following stage to render its thyratron conductive. With the removal of the negative shift pulse at terminal 36, the transistor 28 becomes conductive again and the thyratron 12 is ready to respond to a positive signal pulse from a preceding stage to its control grid 16. The manner in which the signal pulses are delayed for a period which outlasts the effect of the shift pulses will be explained later.

If the thyratron 12 comprising a stage of the register is representing a zero, i.e. is not conducting, at the time the shift pulse from terminal 36 cuts off the transistor 28, no signal is transferred to the next stage because there is no significant change in condition of the thyratron 12. Also, since the thyratrons are responsive only to positive signals, the negative pulses at the plate 16 when a one is inserted into a stage, although they are transmitted to the control grid of the thyratron of the next succeeding stage, have no effect on the system because the thyratrons are responsive only to positive signals on their control grids.

The transistors 28 are chosen to satisfy the requirement that the maximum collector-to-emitter voltage is not exceeded when the transistor turns the thyratron off. Since these transistors also provide amplification, the driving requirements of the shift pulse at terminal 36 are minimized. If desired, a PNP transistor may be substituted for the NPN shown to ease voltage requirements. If this is done, the collector is grounded and the emitter is connected to the cathode of the thyratron. Also, the bias is reversed and the transistor acts as an emitter follower, requiring shift and clear pulses of greater magnitude.

The delays $\tau_1$, $\tau_2$, $\tau_3$, are each longer than the duration of the shift pulse and are provided to insure that each succeeding thyratron 12 down the shift line to the left from terminal 36 will have been cut off and restored to conductive condition before the next adjacent thyratron is cut off. This assures that the thyratrons will be cut off successively and each will be in condition to receive a pulse from the adjacent preceding stage to the left when that stage is in turn cut off.

In the system shown, the delay devices $\tau$ conduct the bias potential to the bases 30 of the transistors 28; consequently, they must pass D.C. In satisfaction of this requirement, a suitable device to provide the delay is a conventional LC lumped constant, with the values of L and C adjusted to provide the desired delay time.

Because of the necessity for providing a series of delays along the shift line, the maximum shift rate ($f_s$) is equal to $$\frac{1}{\tau_1+\tau_2+\ldots\tau_n}$$

and, if a pulse of a length greater than $$\frac{1}{f_s}$$

is applied to the shift line via terminal 36, the register is cleared to an all zero condition.

Figure 2:
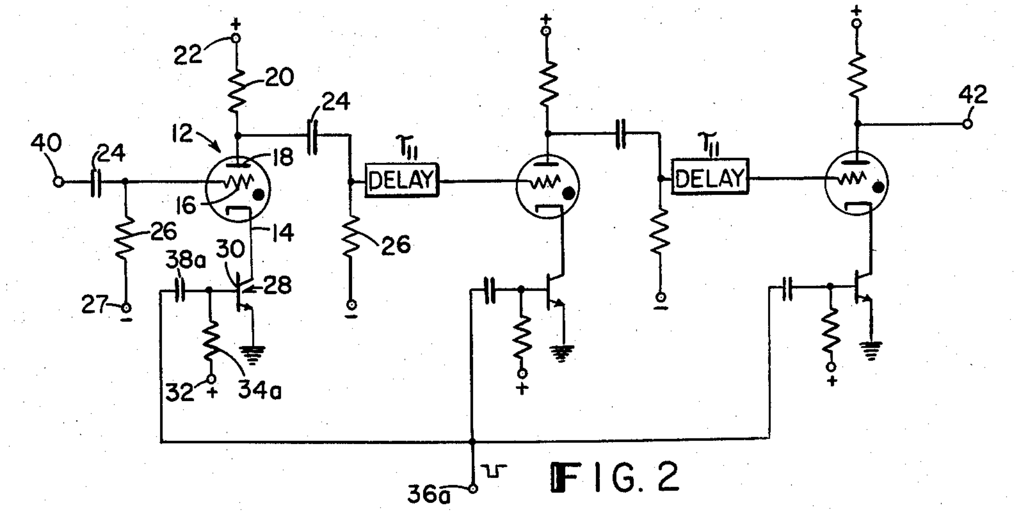
Fig. 2 is a schematic diagram of a modification of the shift register of Fig. 1; and, Fig. 3 is a schematic diagram of a further modification.

If the cumulative delay along the shift line results in too slow a shift rate for a given application, the modification of Fig. 2 is suggested. In this three stage register the shift rate $$(f_s)<\frac{1}{\tau_{11}}$$

where $\tau_{11}$ is the delay in transmitting the signal from the plate of one thyratron to the control grid of another. This delay $\tau_{11}$ may be an additional device inserted in the circuit or may be provided by an appropriate adjustment of capacitor 24 and resistor 26 to provide a suitable RC time constant.

The modified register of Fig. 2 functions in substantially the same manner as the register of Fig. 1 with similarly referenced components operating in a similar manner. The principal difference is that the shift pulse from terminal *36a* cuts off all stages simultaneously instead of sequentially, and the signals produced by the cut off are stored in parallel, each in their respective delay circuit $\tau_{11}$ until the shift pulse has been removed and the thyratrons return to their potentially conductive condition; whereupon, the delayed signals arrive at the respective control grids 16. By applying to terminal *36a* a pulse of a longer duration than $$\frac{1}{f_s}$$

the register is cleared to an all zero condition.

In addition to providing for simultaneous, as distinguished from sequential, delay in shifting, the various stages of the register in the modification of Fig. 2 also provide independent biasing resistors *34a*, and D.C. isolating capacitors *38a* for the base 30 of each transistor 28. This enables the transistors 28 to be independently biased to conducting condition and helps to minimize the driving requirements for the shift and clear pulses applied at terminal 36.

Figure 3:
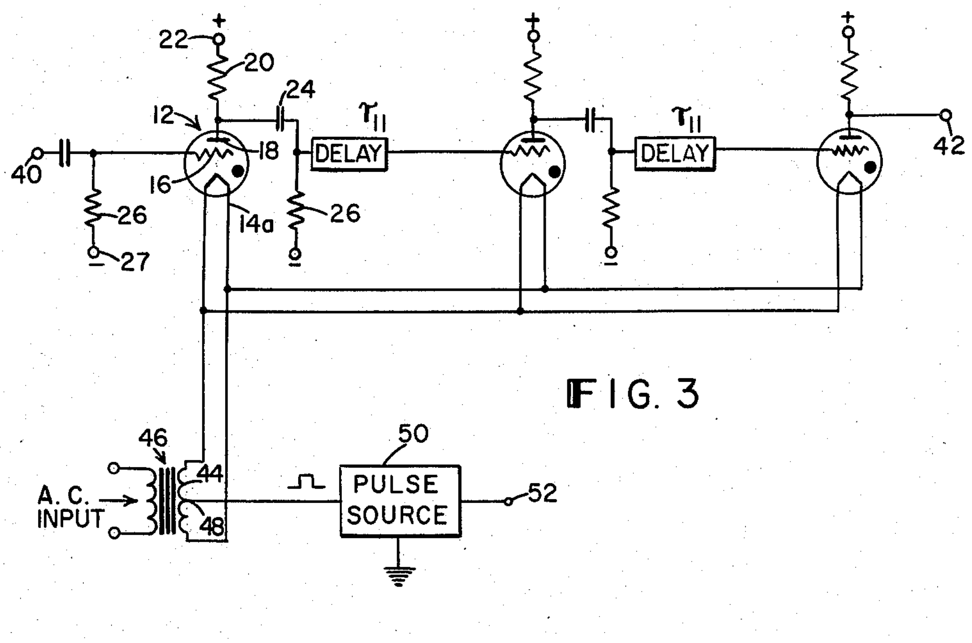

The further modified shift register shown in Fig. 3 uses for its storage elements a type CK1050 thyratron which has a directly heated cathode. The circuit is basically similar to that shown in the other two figures, with simultaneous shift pulsing of all stages, as explained with reference to the modification of Fig. 2. Again, similarly referenced components perform similar functions in the same manner as in the other modifications. The principal feature of the Fig. 3 modification is that the individual transistors 28 in each thyratron cathode return are replaced by a single pulse source which is effective to reduce the cathode-plate current of all the thyratrons in the register by raising their common cathode potential.

Referring to Fig. 3, the register functions in the same manner as that of Fig. 2 except for the cathode circuits of the thyratron 12 and the shift pulse operation. The cathodes *14a* of all of the storage thyratrons 12 are supplied heater voltage in common from the secondary winding 44 of transformer 46, and are connected, through a center tap 48 on winding 44, to a pulse source 50 which in response to synchronizing pulses at its input terminal 52 provides a positive output pulse at the center tap 48. This pulse is of sufficient amplitude to reduce the current between the plates and cathodes of conducting thyratrons 12 to the point where they cut off. The cathodes thereupon return substantially to ground potential, after the positive shift pulse has terminated, in readiness to conduct again in response to a proper signal on their control grids 16.

The pulse source 50 may be any of the conventional devices, such as transistor switching circuits, cathode followers and mono-stable blocking oscillators suitable for providing a positive pulse of the proper shape and duration to accomplish cut off. An additional requirement of the pulse source 50 in the circuit shown is that it provide a path to ground for cathodes 14*a* of the thyratrons 12. Also, provision may be made to increase the pulse duration beyond the delay period of $\tau_{11}$ at appropriate times, or provide additional pulses of proper duration, to extend the enforced cut-off period of the thyratrons 12 to outlast the transfer of a signal pulse from one stage to another in order to clear the register to all zeros.

In this manner one embodiment of the invention and modifications thereof provide a shift register wherein bistable glow tubes are used as signal or storage elements to give visual as well as electrical indication of the digital content of each register stage. The invention is not, however, limited to the specific embodiment and modifications shown and described, but embraces the full scope of the following claims.

What is claimed is:

1. A pulse shifting register which comprises: a plurality of gaseous discharge tubes each having anode, cathode, and control grid electrodes; a plurality of pulse delay devices connecting said tubes, anode of one to grid of another, in a series chain; means for applying input pulses to the control grid of the first tube in said series; means for biasing each of said tubes to cut-off condition independently of the conductive condition of the remaining ones of said tubes; a source of potential connected across the anode and cathode of each of said tubes; pulse responsive switching means connected to the cathodes of said tubes and arranged to control said anode-cathode potential; and means for providing at said switching means pulses capable of switching said tubes between conductive and non-conductive condition.

2. The invention according to claim 1 wherein: said cathodes comprise filamentary heaters; a transformer power supply including a center tapped secondary winding is provided for said heaters; and, said switching means includes a pulse source connected to said center tap on said secondary winding.

3. A pulse shifting register which comprises: a plurality of gaseous discharge tubes each having anode, cathode, and control grid electrodes; a plurality of pulse delay devices connecting said tubes, anode of one to grid of another, in a series chain; means for applying input pulses to the control grid of the first tube in said series; means for deriving output pulses from the anode of the last tube in said series; means for biasing each of said tubes to cut-off condition independently of the conductive condition of the remaining ones of said tubes; a source of potential connected across the anode and cathode of each of said tubes; pulse responsive switching means including a separate transistor in series connection to the cathodes of each one of said tubes and arranged to control said anode-cathode potential; a source of transistor cut-off pulses; and, means connecting said source to said transistors.

4. A pulse shifting register which comprises: a plurality of gaseous discharge tubes each having anode, cathode, and control grid electrodes; a plurality of pulse delay devices connecting said tubes, anode of one to grid of another, in a series chain; means for applying input pulses to the control grid of the first tube in said series; means for deriving output pulses from the anode of the last tube in said series; means for biasing each of said tubes to cut-off condition independently of the conductive condition of the remaining ones of said tubes; a source of potential connected across the anode and cathode of each of said tubes; pulse responsive switching means including a separate transistor in series connection to the cathodes of each one of said tubes and arranged to control said anode-cathode potential; a serial delay line; a source of transistor cut-off pulses connected to said delay line; and means connecting said transistors individually to separate points along said delay line.

5. A pulse shifting register which comprises: a plurality of gaseous discharge tubes each having anode, cathode, and control grid electrodes; a plurality of pulse delay devices connecting said tubes, anode of one to grid of another, in a series chain; means for applying input pulses to the control grid of the first tube in said series; means for deriving output pulses from the anode of the last tube in said series; means for biasing each of said tubes to cut-off condition independently of the conductive condition of the remaining ones of said tubes; a source of potential connected across the anode and cathode of each of said tubes; pulse responsive switching means including a separate transistor in series connection to the cathodes of each one of said tubes and arranged to control said anode-cathode potential; and a source of transistor cut-off pulses connected to said transistors, said source being capable of producing shift pulses having a duration shorter than the pulse delay period of said anode to control grid delay device connections and clear pulses having a duration longer than said delay period.

References Cited in the file of this patent

UNITED STATES PATENTS

| | | |
|---|---|---|
| 2,792,525 | McArdle | May 14, 1957 |
| 2,851,220 | Kimes | Sept. 9, 1958 |